Figure 3:
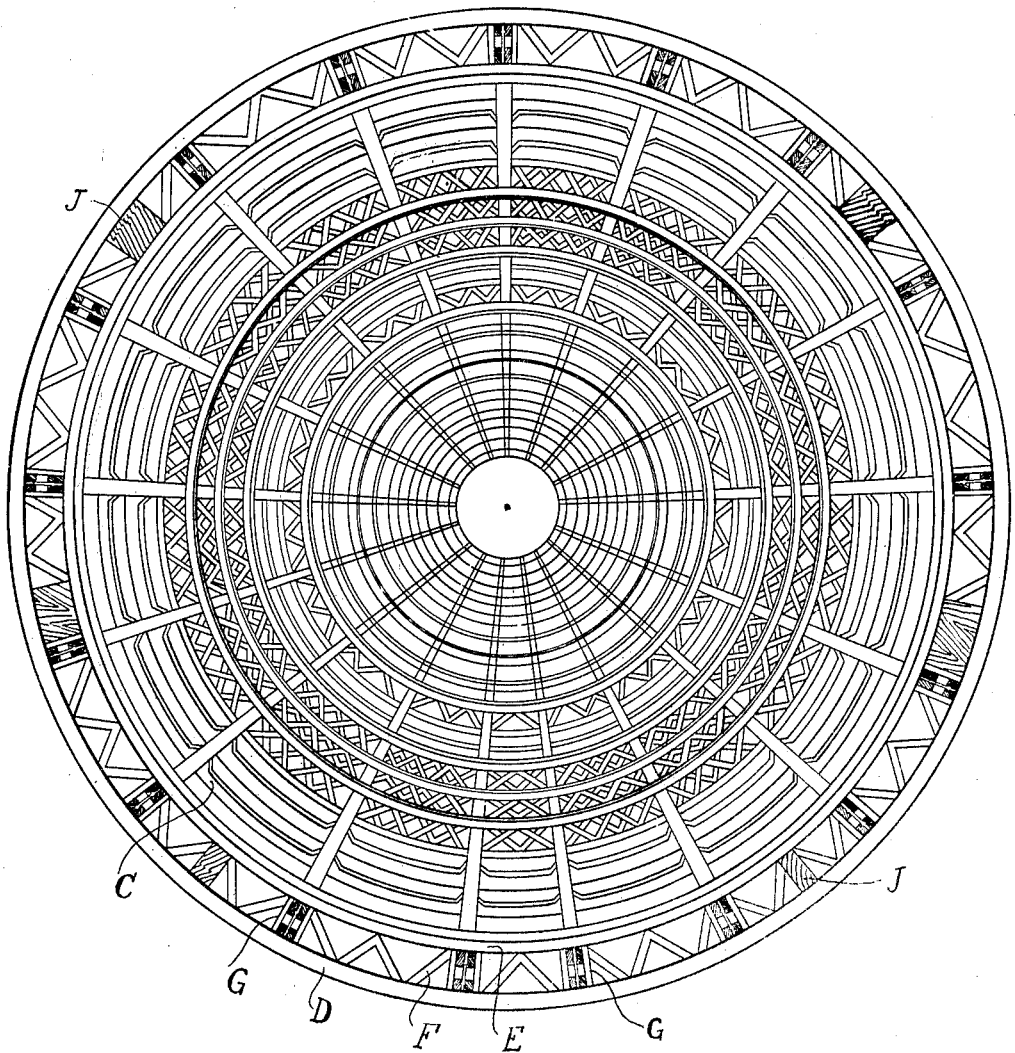

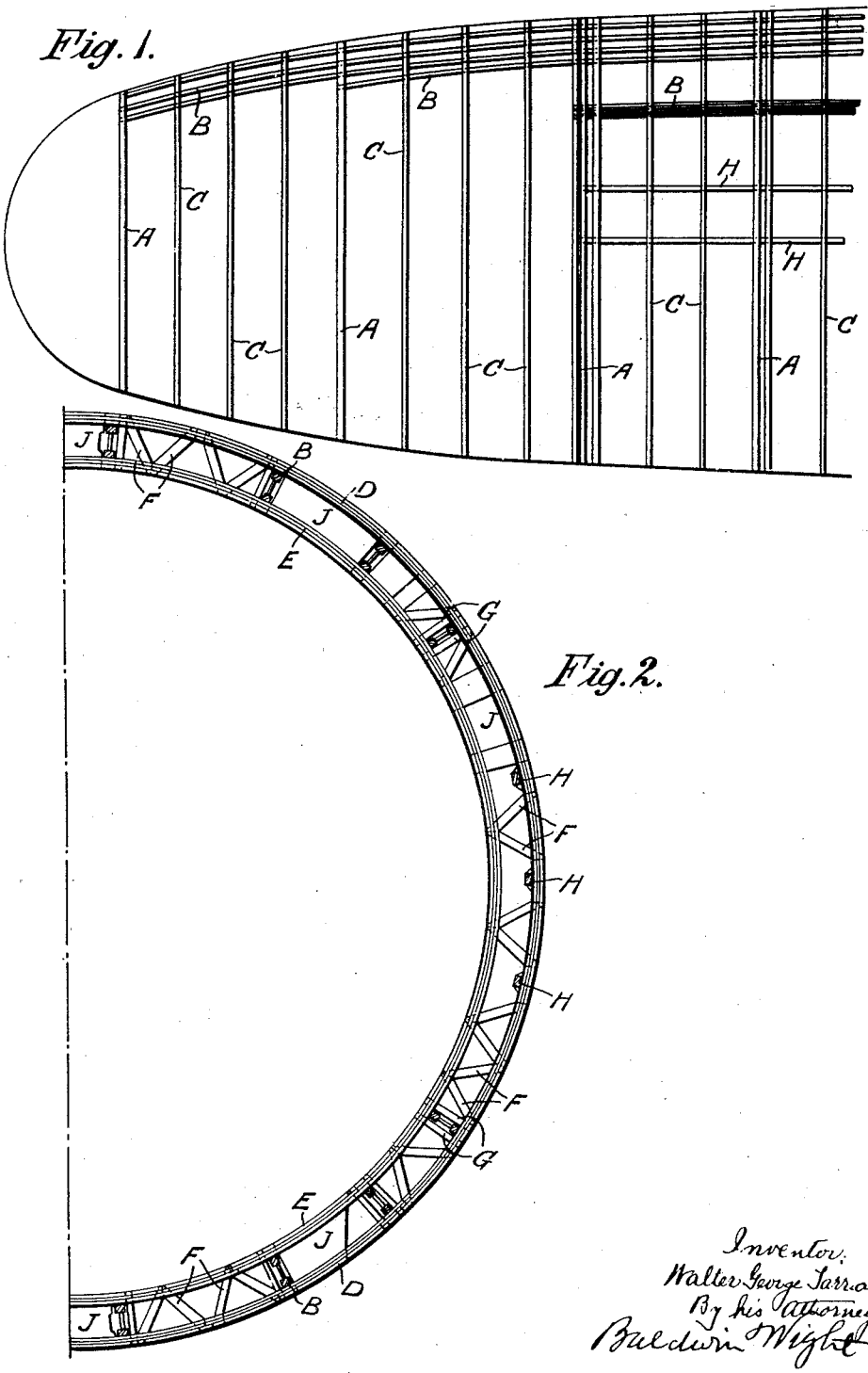

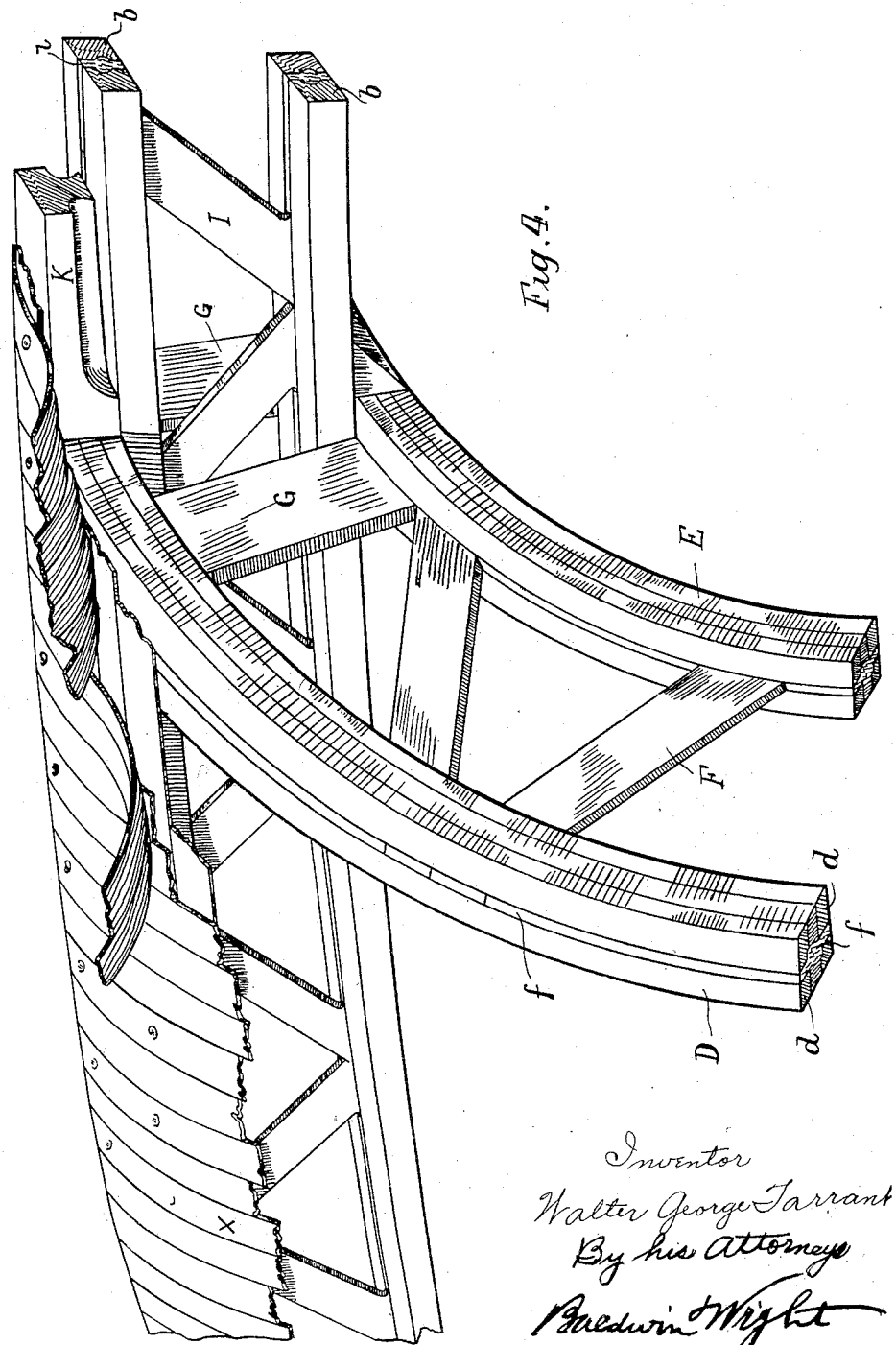

UNITED STATES PATENT OFFICE.

WALTER GEORGE TARRANT, OF BYFLEET, ENGLAND.

AEROPLANE-FUSELAGE.

1,329,682.  Specification of Letters Patent.  Patented Feb. 3, 1920.

Application filed March 27, 1919. Serial No. 285,625.

*To all whom it may concern:*

Be it known that I, WALTER GEORGE TARRANT, a subject of the King of Great Britain, residing at Lake House, Byfleet, in the county of Surrey, England, have invented a new and useful Improvement in or Connected with Aeroplane-Fuselages, of which the following is a specification.

This invention relates to improvements in or connected with aeroplane fuselages, and has for its object to provide a strong yet light construction of fuselage very suitable for large aeroplanes and a firm connection between the fuselage and spars of the adjacent wings and tail planes.

According to this invention the fuselage framing comprises a series of circular girders or main ribs and longitudinal girders or longerons built into them, the circular girders or ribs being suitably spaced apart according to the size of the fuselage and intersecting the longerons at right angles.

Between the circular girders or main ribs former ribs are fixed and the whole is inclosed in a casing or sheathing of two, three or four ply wood, glued and screwed to the longerons and rings, the whole forming an exceedingly strong and economical structure.

My invention is illustrated by the accompanying drawings, Figure 1 of which is a side elevation of a portion of the fuselage of an aeroplane partly constructed and Fig. 2 is a front elevation of half of one of the main circular girders with the longerons in section. Fig. 3 is a section through the fuselage of a large aeroplane looking toward the tail, while Fig. 4 is a perspective view of part of the fuselage showing the method of construction.

In Fig. 1, A, A, are circular girders and B, B, are longerons which are built into the girders A. C, C, are light circular former ribs arranged between the main girders A and connected to the longerons B. When the parts already mentioned have been erected in place they are inclosed in a sheathing of ply wood X.

Each of the girders A is constructed of two wooden concentric rings D, E, connected together by wooden braces F, each of the rings being built up of several strips of wood $d$ bent to shape and glued together, while the ends of the braces F have beads formed upon them and lying in grooves in the rings; the pieces $f$ are inserted between the ends of the braces and between the strips $d$ so as to make each ring one solid whole, the various parts being all glued together. G are radial braces connected to the rings D, E, and arranged one on each side of a longeron where it passes through a girder. The braces G are connected to the rings D and E in a similar way to the braces F. The longerons B are similarly formed of strips of wood $b$, inclined and beaded braces I, and pieces $i$ all glued together. H are light longerons connected to the outer ring D. J are filling pieces inserted between the rings D, E. Packing pieces K equal in thickness to the rings D are secured to the outer faces of the longerons between each ring and the next so as to make a flush surface. The girders and former ribs are of course made of varying diameter to give the necessary stream line to the fuselage contour.

By this invention a very strong and light structure is obtained.

What I claim is:—

1. In an aeroplane fuselage, the combination of a plurality of transverse circular girders each comprising two concentric rings and braces connecting the rings, a plurality of longerons each of which is composed of two longitudinal members with braces connecting the members and each of which passes through each of the transverse girders between the two rings thereof and means for securing the longerons in position in the girders.

2. In an aeroplane fuselage, the combination of a plurality of transverse circular girders each comprising two concentric rings and braces connecting the rings, filling pieces between the rings, a plurality of longerons each of which is composed of two longitudinal members with braces connecting the members and each of which passes through each of the transverse girders between the two rings thereof and means for securing the longerons in position in the girders.

3. In an aeroplane fuselage, the combination of a plurality of transverse circular girders each comprising two concentric rings and braces connecting the rings, a plurality of longerons each of which is composed of two longitudinal members with braces connecting the members and each of which passes through each of the transverse girders between the two rings thereof, means for securing the longerons in position in the girders and radial braces connected to the two rings on either side of a longeron.

4. In an aeroplane fuselage, the combination of a plurality of transverse circular girders each comprising two concentric rings and braces connecting the rings, filling pieces between the rings, a plurality of longerons each of which passes through each of the transverse girders between the two rings thereof, means for securing the longerons in position in the girders and radial braces connected to the two rings on either side of a longeron.

5. In an aeroplane fuselage, the combination of a plurality of transverse circular girders each comprising two concentric rings and braces connecting the rings, filling pieces between the rings, a plurality of longerons each of which is composed of two longitudinal members with braces connecting the members and each of which passes through each of the transverse girders between the two rings thereof, means for securing the longerons in position in the girders, and radial braces connected to the two rings on either side of a longeron.

6. In an aeroplane fuselage, the combination of a plurality of transverse circular girders each comprising two concentric rings and braces connecting the rings, a plurality of longerons each of which is composed of two longitudinal members with braces connecting the members and each of which passes through each of the transverse girders between the two rings thereof, means for securing the longerons in position in the girders and a wooden sheathing secured to the outer rings of the transverse girders.

7. In an aeroplane fuselage, the combination of a plurality of transverse circular girders each comprising two concentric rings and braces connecting the rings, filling pieces between the rings, a plurality of longerons each of which is composed of two longitudinal members with braces connecting the members and each of which passes through each of the transverse girders between the two rings thereof, means for securing the longerons in position in the girders and wooden braces connected to the two rings on either side of a longeron.

8. In an aeroplane fuselage, the combination of a plurality of transverse circular girders each comprising two concentric rings and braces connecting the rings, a plurality of longerons each of which passes through each of the transverse girders between the two rings thereof, means for securing the longerons in position in the girders, radial braces connected to the two rings on either side of a longeron and a wooden sheathing secured to the outer rings of the transverse girders.

9. In an aeroplane fuselage, the combination of a plurality of transverse circular girders each comprising two concentric rings and braces connecting the rings, a plurality of longerons each of which is composed of two longitudinal members with braces connecting the members and each of which passes through each of the transverse girders between the two rings thereof, means for securing the longerons in position in the girders, radial braces connected to the two rings on either side of a longeron, and a wooden sheathing secured to the outer rings of the transverse girders.

10. In an aeroplane fuselage, the combination of a plurality of transverse circular girders each comprising two concentric rings and braces connecting the rings, filling pieces between the rings, a plurality of longerons each of which passes through each of the transverse girders between the two rings thereof, means for securing the longerons in position in the girders, radial braces connected to the two rings on either side of a longeron and a wooden sheathing secured to the outer rings of the transverse girders.

11. In an areoplane fuselage, the combination of a plurality of transverse circular girders each comprising two concentric rings and braces connecting the rings, filling pieces between the rings, a plurality of longerons each of which is composed of two longitudinal members with braces connecting the members and each of which passes through each of the transverse girders between the two rings thereof, means for securing the longerons in position in the girders, radial braces connected to the two rings on either side of a longeron and a wooden sheathing secured to the outer rings of the transverse girders.

In testimony that I claim the foregoing as my invention I have signed my name this 21st day of February, 1919.

WALTER GEORGE TARRANT.